United States Patent
Bushnell et al.

(10) Patent No.: US 7,058,415 B2
(45) Date of Patent: Jun. 6, 2006

(54) SYSTEM FOR PROVIDING UNIFIED CELLULAR AND WIRE-LINE SERVICE TO A DUAL MODE HANDSET

(75) Inventors: William Jackson Bushnell, St. Charles, IL (US); John E. Allers, Roswell, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 392 days.

(21) Appl. No.: 10/436,730

(22) Filed: May 12, 2003

(65) Prior Publication Data

US 2004/0229634 A1    Nov. 18, 2004

(51) Int. Cl.
*H04Q 7/20* (2006.01)

(52) U.S. Cl. .................... 455/461; 455/448; 455/426.1; 455/552.1; 379/142.06; 379/142.07; 379/207.15

(58) Field of Classification Search ................ 455/448, 455/426.1, 461, 552.1; 379/207.15, 142.06, 379/142.07, 142.14, 201.01, 201.02
See application file for complete search history.

(56) References Cited

U.S. PATENT DOCUMENTS

| | | | |
|---|---|---|---|
| 5,815,808 A | * | 9/1998 | Valentine ................. 455/422.1 |
| 6,351,637 B1 | * | 2/2002 | Lee ............................ 455/415 |
| 6,363,246 B1 | * | 3/2002 | Williams et al. ............ 455/403 |

* cited by examiner

*Primary Examiner*—George Eng
*Assistant Examiner*—Wesley Kim

(57) ABSTRACT

The dual mode handset system provides unified cellular service and wire-line service with a single Directory Number assigned to the dual mode handset and a corresponding cordless base station that are connected to the subscriber's local wire-line (POTS line) connection to the telephone network. The dual mode handset is programmed to operate as a cordless telephone when in proximity of the cordless base station. The handset operates as a cellular telephone when it is out of reach of the cordless base station. The dual mode handset is assigned the same telephone number as the subscriber's connection to a local wire-line telephone switching system. Consequently, the Caller ID information is consistent on calls originated through the dual mode handset, regardless of whether the call passes through the cordless base station to the subscriber's connection to a local wire-line telephone switching system or the cellular network.

12 Claims, 7 Drawing Sheets

SYSTEM FOR PROVIDING UNIFIED CELLULAR AND WIRE-LINE SERVICE TO A DUAL MODE HANDSET

FIELD OF THE INVENTION

This invention relates to telephone communication systems and in particular, to a system for providing unified service to a dual mode handset that is equipped for both wire-line and cellular service.

PROBLEM

It is a problem with existing cellular networks that many cellular subscribers are using the cellular telephones regardless of whether they are located at home, at the office or in-transit in a roaming mode. Cellular service providers have constructed their infrastructure using cell towers located along highways and in public areas to support the cellular subscribers as they traveled from location to location, rather than at fixed site locations, such as home or office. The increase in the volume of cellular calls directed to or from the subscriber's home and office locations causes two problems. First, the cellular service provider must build out the wireless network infrastructure of cell towers and associated switching equipment to serve the increased call volume in residential and office locations. Secondly, there is an underutilization of the local wire-line telephone network since the local wire-line telephone service provider processes reduced call volumes. In some instances, the cellular service provider and the local wire-line telephone service provider are parts of the same company. Thus, the company would benefit from a system that better utilizes their existing wire-line telephone infrastructure and avoid additional investment in the wireless network infrastructure.

One existing system that partially addresses this problem uses dual mode handsets 105 that function both as a cordless, wire-line based telephone and a cellular telephone. FIGS. 1 & 2 illustrate in block diagram form the overall architecture of existing wire-line 110 and cellular networks 100 and the implementation of inbound and outbound call connections using a dual mode telephone in this environment. The dual mode handset 105 works in conjunction with a cordless base station 106 that is located in a residence 107 and is attached to the subscriber's local wire-line (POTS line) connection to a local wire-line telephone switching system 108. When the dual mode handset 105 is within reception range of the cordless base station 106, calls are originated and received through the connected POTS line. When the dual mode handset 105 is no longer within reception range of the cordless base station 106, calls are originated and received with the dual mode handset 105 via the cellular network 100. One of the problems with this arrangement is that incoming calls to the subscriber are routed based on the called number. Therefore, if someone dials the subscriber's POTS number (630-222-1000), the call is routed to the cordless base station 106, even if the subscriber is out of range of the cordless base station 106.

The existing Simultaneous Ring feature executing in the local switch 108 can be used to overcome this problem, as shown in FIG. 1. The Simultaneous Ring feature causes a incoming call to the POTS line (630-222-1000) to ring both the POTS line connected to the cordless base station 106 and the subscriber's cell phone (630-444-1000). The subscriber can then answer using either telephone number or the dual mode handset 105 can be programmed to select the cordless base station 106 via the subscriber's local wire-line presence. The Simultaneous Ring feature therefore provides a solution to the incoming call portion of the problem but does not address the outgoing call issue of Caller ID on outgoing calls. When a subscriber initiates an outgoing call through the cordless base station 106, the Caller ID for the call is the ID of the POTS line, while a call initiated via the cellular network 100 produces a Caller ID that is the ID of the cell phone number, as shown in FIG. 2. Thus, when a called party receives the call initiated by the subscriber, there can be confusion because of the two distinct Caller ID numbers for the same subscriber.

SOLUTION

The above-described problems are solved and a technical advance achieved by the present system for providing unified service to a dual mode handset equipped for both wire-line and cellular service, termed "dual mode handset system" herein. The dual mode handset system provides unified cellular service and wire-line service with a single Directory Number assigned to the dual mode handset and a corresponding cordless base station that are connected to the subscriber's local wire-line (POTS line) connection to the telephone network.

The dual mode handset is programmed to operate as a cordless telephone when in proximity of the cordless base station. The dual mode handset operates as a cellular telephone when it is out of reach of the cordless base station. The dual mode handset is assigned the same telephone number as the subscriber's connection to a local wire-line telephone switching system. Within the cellular network, a Home Location Register (HLR) is established which contains the Mobile Identification Number (MIN) for the handset. The telephone number of the subscriber's connection to a local wire-line telephone switching system is used as the telephone number for the dual mode handset in the cellular network. When the dual mode phone is in range of the cordless base station, the handset originated calls are routed through the base station to the subscriber's connection to a local wire-line telephone switching system using the traditional cordless signaling techniques. The Caller ID for these calls is the subscriber's connection to a local wire-line telephone switching system. When the dual mode handset is not in proximity of the base station, the handset registers with the cellular service provider. When the cellular network receives the Mobile Identification Number (MIN) for the handset it confirms that the number is valid by accessing the Home Location Register. When the dual mode handset originates calls on the cellular network the Caller ID for the call is the Caller ID for the subscriber's connection to a local wire-line telephone switching system. Consequently, the Caller ID information is consistent on calls originated through the dual mode handset, regardless of whether the call passes through the base station or the cellular network.

The dual mode handset system also allows incoming calls to first attempt to reach the subscriber through the local switch in the wireline network. If however the user is out of range of the cordless base station, the cordless base station initiates a call to the local switch which activates call forwarding. The call forwarding to number is referred to as a shadow Directory Number (DN) which is a valid telephone number assigned to the cellular network. The local switch forwards the call to the cellular network. The cellular network queries the Home Location Register (HLR) which then maps the Shadow DN to the Cell Phones directory number and completes the call. In this manner, the telephone number associated with the subscriber's connection to a local wire-line telephone switching system is able to roam on the cellular network.

DETAILED DESCRIPTION

Cellular Communication Network Philosophy

Figure 1:
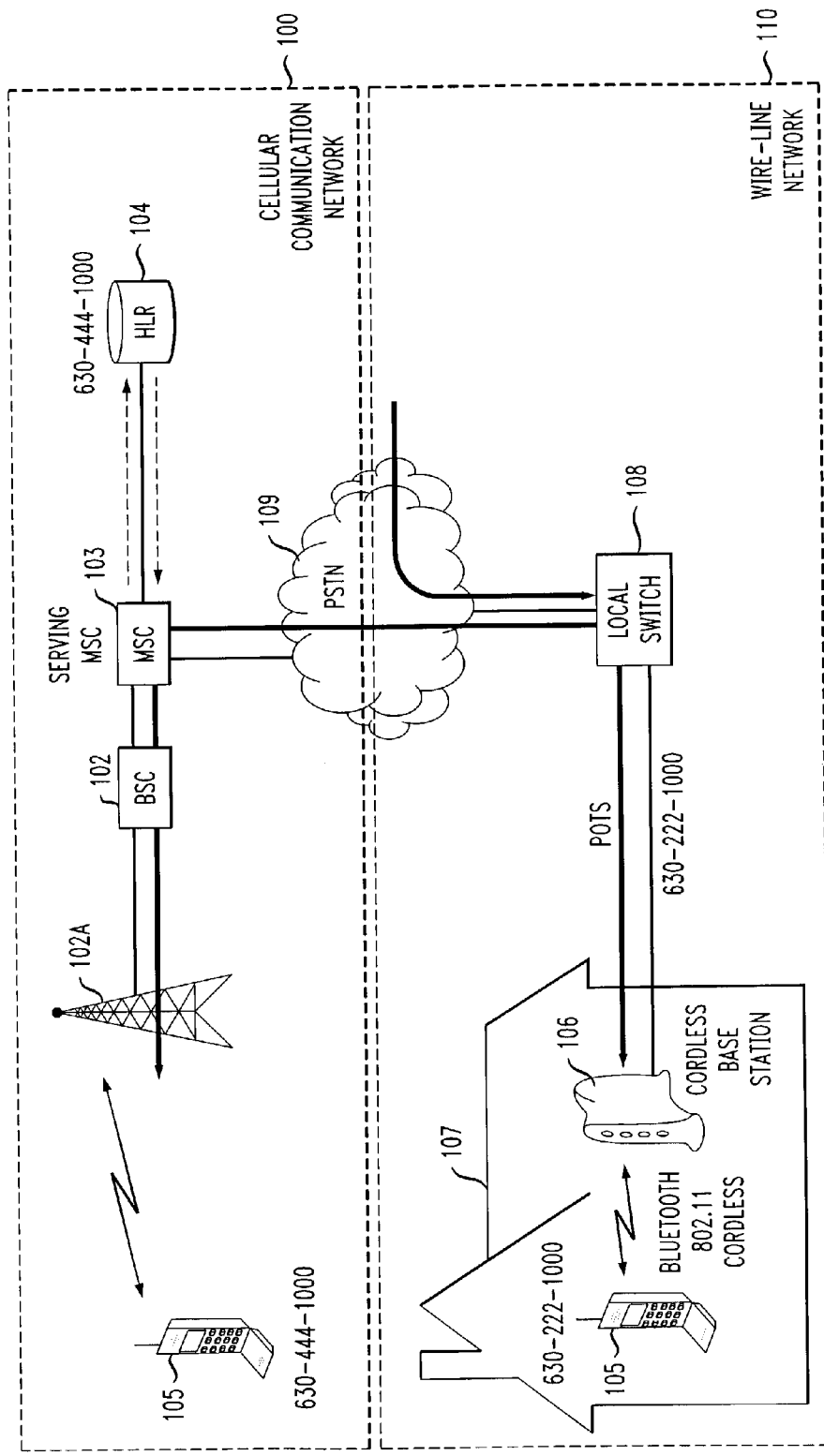
FIG. 1 illustrates in block diagram form the overall architecture of existing wire-line and cellular networks and the implementation of an inbound call connection to a dual mode telephone in this environment.
Figure 2:
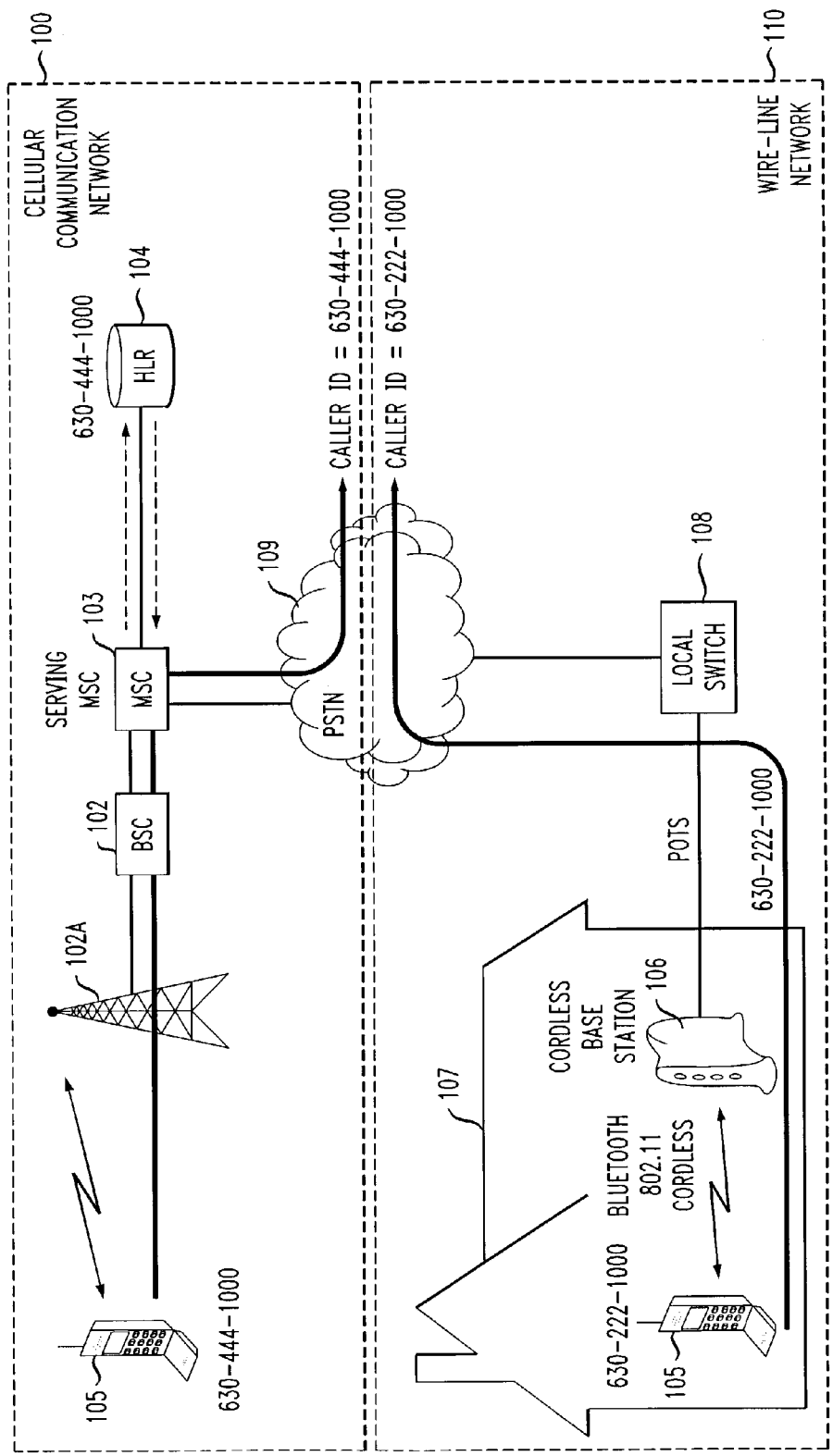
FIG. 2 illustrates in block diagram form the overall architecture of existing wire-line and cellular networks and the implementation of an outbound call connection from a dual mode telephone in this environment.

Cellular communication networks 100, as shown in block diagram in FIGS. 1 and 2, provide the service of connecting wireless telecommunication customers, each having a mobile subscriber station 105, to both land-based customers who are served by the common Carrier Public Switched Telephone Network (PSTN) 109 as well as other wireless telecommunication customers. In such a network, all incoming and outgoing calls are routed through Mobile Switching Centers (MSC) 103, each of which is connected to a plurality of Base Station Controllers 102 that communicate with mobile subscriber stations 105 located in the area covered by the cell sites. Each cell site contains a group of radio transmitters and receivers, termed a "Base Stations" 102A herein, with each transmitter-receiver pair being connected by one communication link that interconnects the Base Station 102A with the Base Station Controller 102. Each transmitter-receiver pair operates on a pair of radio frequencies to create a communication channel: one frequency to transmit radio signals to the mobile subscriber station and the other frequency to receive radio signals from the mobile subscriber station. The Mobile Switching Center 103, in conjunction with the Home Location Register (HLR) 104 and a Visitor Location Register (VLR), manages subscriber registration, subscriber authentication, and the provision of wireless services such as voice mail, call forwarding, roaming validation and so on.

The control channels that are available in this system are used to set up the communication connections between the subscriber stations 105 and the Base Station 102. When a call is initiated, the control channel is used to communicate between the mobile subscriber station 105 involved in the call and the local serving Base Station 102. The control messages locate and identify the mobile subscriber station 105, determine the dialed number, and identify an available voice/data communication channel consisting of a pair of radio frequencies (and orthogonal coding for CDMA systems) which is selected by the Base Station 102 for the communication connection. The radio unit in the mobile subscriber station 105 re-tunes the transmitter-receiver equipment contained therein to use these designated radio frequencies and orthogonal coding. Once the communication connection is established, the control messages are typically transmitted to adjust transmitter power and/or to change the transmission channel when required to hand off this mobile subscriber station 105 to an adjacent cell, when the subscriber moves from the present cell to one of the adjoining cells. The transmitter power of the mobile subscriber station 105 is regulated since the magnitude of the signal received at the Base Station 102 is a function of the subscriber station transmitter power and the distance from the Base Station 102. Therefore, by scaling the transmitter power to correspond to the distance from the Base Station 102, the received signal magnitude can be maintained within a predetermined range of values to ensure accurate signal reception without interfering with other transmissions in the cell.

The voice communications between mobile subscriber station 105 and other subscriber stations is effected by routing the communications received from the mobile subscriber station 105 through the Mobile Switching Center 103 and trunks to the Public Switched Telephone Network (PSTN) 109 where the communications are routed to a Local Switch 108 that serves land line based subscriber stations 106. There are numerous Mobile Switching Centers 103 that are connected to the Public Switched Telephone Network (PSTN) 109 to thereby enable subscribers at both land line based subscriber stations and mobile subscriber stations to communicate between selected stations thereof. This architecture represents the present architecture of the wireless and wire-line communication networks.

Dual Mode Handset System

Figure 3:
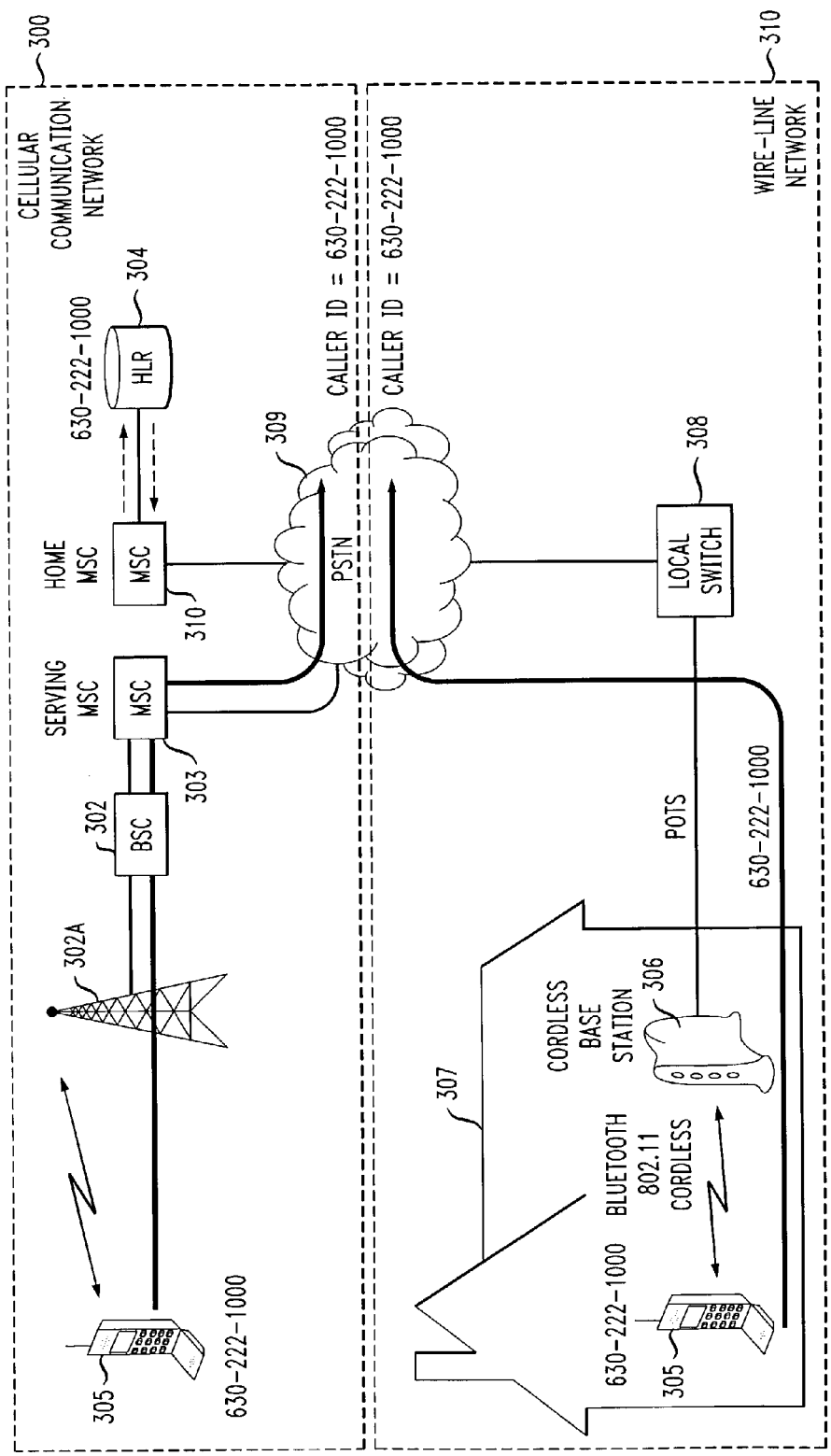
FIG. 3 illustrates in block diagram form the overall architecture of wire-line and cellular networks and the implementation of an outbound call connection by the present dual mode handset system in this environment.
Figure 4:
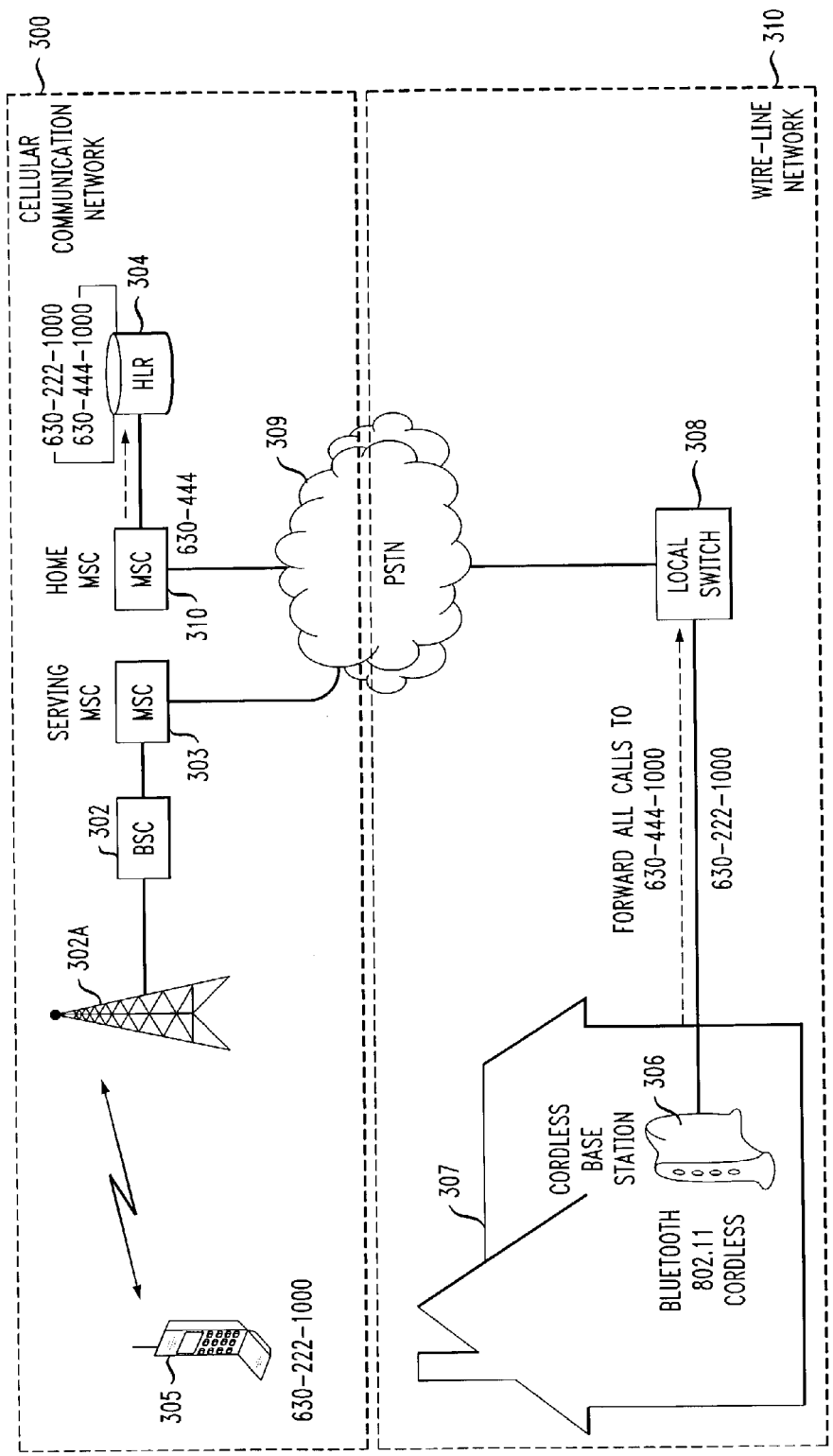
FIG. 4 illustrates in block diagram form the overall architecture of wire-line and cellular networks and the activation of the Call Forward All Calls by the present dual mode handset system.
Figure 5:
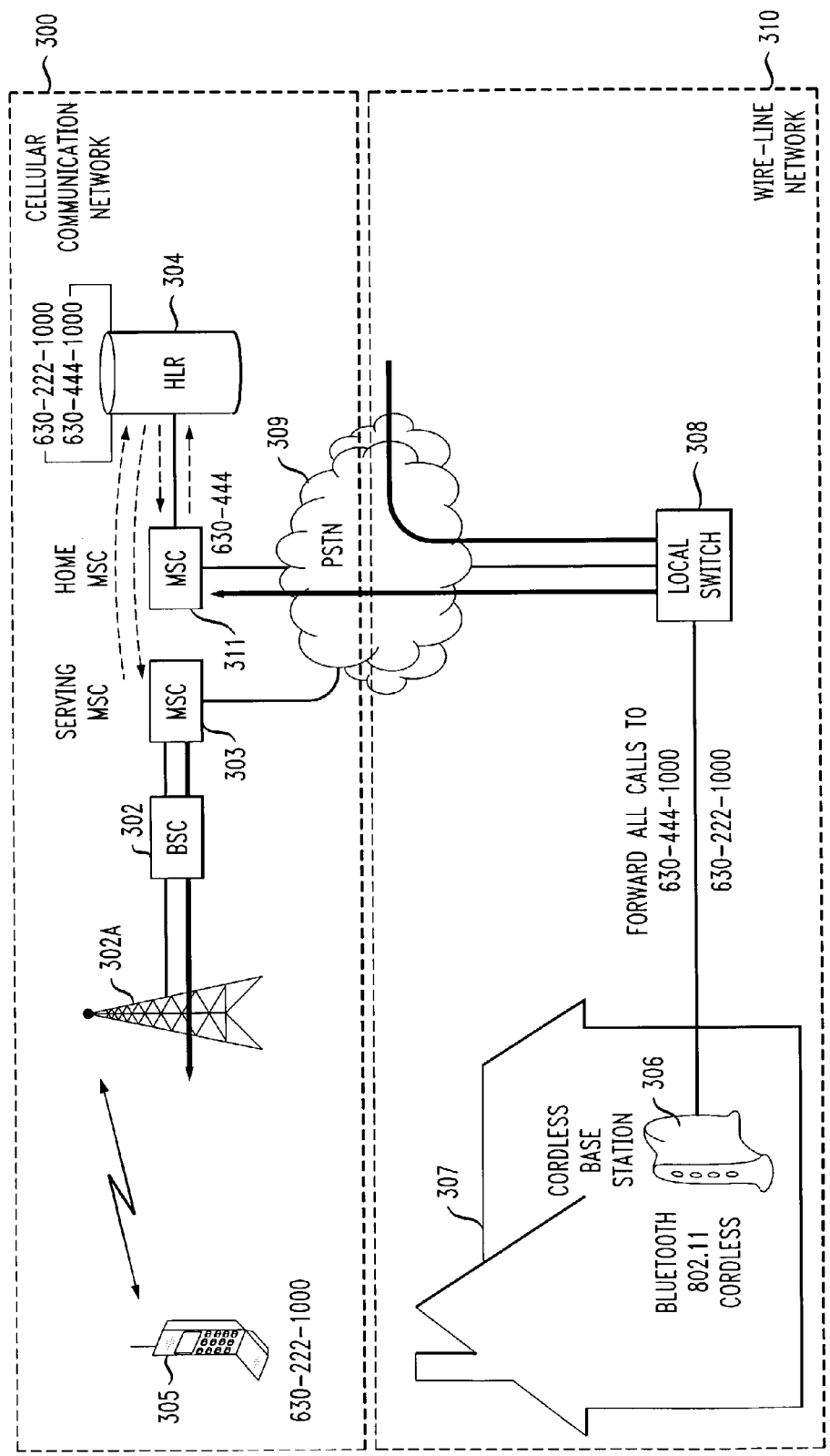
FIG. 5 illustrates in block diagram form the overall architecture of wire-line and cellular networks and the implementation of an inbound call connection by the present dual mode handset system.

FIG. 3 illustrates in block diagram form the overall architecture of wire-line and cellular networks and the implementation of an outbound call connection by the present dual mode handset system in this environment. FIG. 4 illustrates in block diagram form the overall architecture of wire-line and cellular networks and the activation of the Call Forward All Calls by the present dual mode handset system. FIG. 5 illustrates in block diagram form the overall architecture of wire-line and cellular networks and the implementation of an inbound call connection by the present dual mode handset system. The operation of the respective cellular network 300 and wire-line network 310 are as described above with respect to FIGS. 1 & 2, with the elements labeled with 3 numbers in FIG. 3 corresponding to elements labeled with 1 numbers in FIGS. 1 & 2.

The dual mode telephone station set 305 consists of a subscriber terminal device that is programmed to operate as a cordless telephone when in proximity of the cordless base station 306. The dual mode telephone station set 305 also operates as a cellular telephone 305 when it is out of reach of the cordless base station 306. The implementation of the dual mode telephone station set 305 can be that of a traditional dual mode handset, operating with a cordless base station 306 via a high frequency radio link, or it can be a subscriber terminal device that connects to a base station via another wireless paradigm, such as Bluetooth protocol, the EIA 802.11 protocol, infrared link or any other wireless communication mode that enables the dual mode telephone station set 305 to be operable in a mode where it is not tethered to the cordless base station 306. For the purposes of this description, the configuration shall be referred to as a dual mode telephone station set 305, operable with a cordless base station 306 located within and/or proximate to a fixed site location, such as a subscriber office or residence 307.

The dual mode telephone station set 305, when operating in the cellular mode, is assigned the same telephone number as the subscriber's connection to a local wire-line telephone switching system 308. Within the cellular network 300, a Home Location Register (HLR) 304 is established which contains the Mobile Identification Number (MIN) for the dual mode telephone station set 305 and a Shadow Directory Number that represents a physical presence of the dual mode telephone station set 305 within the cellular network 300. Thus, the dual mode telephone station set 305 has one Directory Number for Caller ID purposes, but its location within the cellular network 300 is differentiated from its presence within the local wire-line telephone switching system 308 via the use of the Shadow Directory Number. Thus, the telephone number of the subscriber's connection to a local wire-line telephone switching system 308 is used as the telephone number for the dual mode telephone station set 305 in the cellular network 300 for Caller ID purposes.

When the dual mode telephone station set 305 is in range of the cordless base station 306, the dual mode handset originated calls are routed through the cordless base station 306 to the subscriber's connection to a local wire-line telephone switching system 308 using the traditional wire-line signaling techniques. The Caller ID for these calls is the subscriber's connection to a local wire-line telephone switching system 308. When the dual mode telephone station set 305 is not in proximity to the cordless base station 306, the dual mode telephone station set 305 registers with the cellular service provider. When the cellular network 300 receives the Mobile Identification Number (MIN) for the dual mode telephone station set 305 it confirms that the number is valid by accessing the Home Location Register 304. When the dual mode telephone station set 305 originates calls on the cellular network the Caller ID for the call is the Caller ID for the subscriber's connection to a local wire-line telephone switching system 308. Consequently, the Caller ID information is consistent on calls originated through the dual mode telephone station set 305, regardless of whether the call originates via the cordless base station 306 and the serving wireline telephone network 310 or the cellular network 300. In this manner, the telephone number associated with the subscriber's connection to a local wire-line telephone switching system 308 is able to roam on the cellular network 300.

Cordless Bas Station Operation in the Present Dual Mode Handset System

Figure 6:
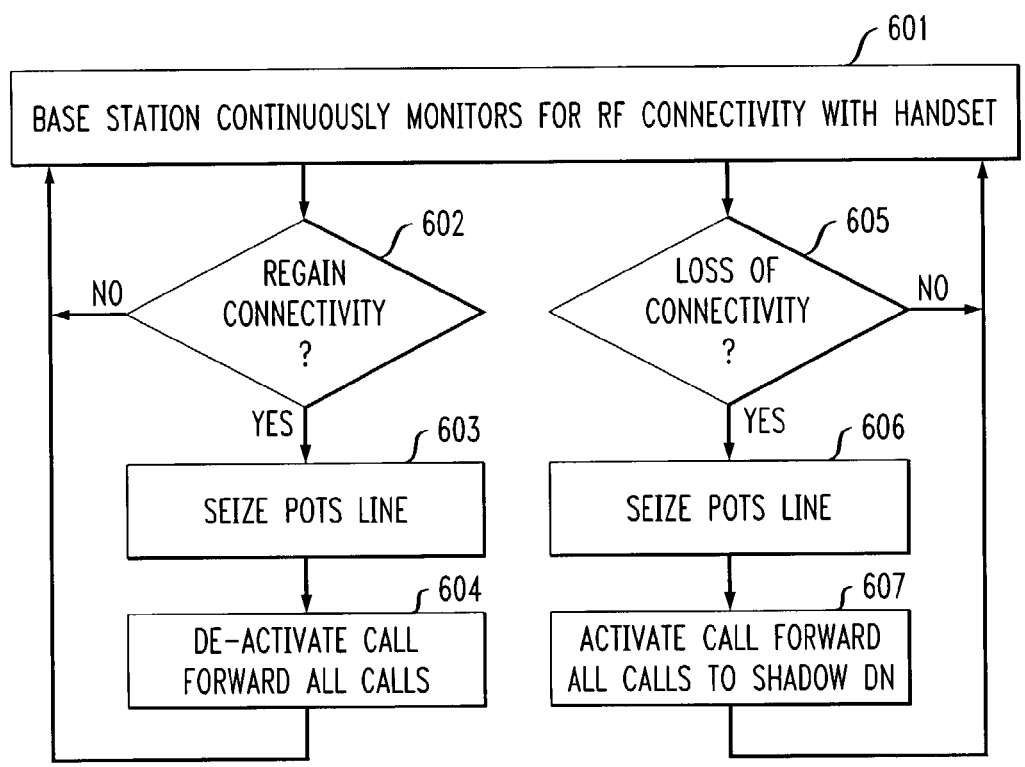
FIG. 6 illustrates in flow diagram form the steps taken by the cordless base station in the present dual mode handset system.

FIG. 6 illustrates in flow diagram form the steps taken by the cordless base station 306 in the present dual mode handset system. At step 601 the cordless base station 306 continuously monitors the radio frequency connection with the dual mode telephone station set 305 to determine whether the cordless base station 306 is in communication with the dual mode telephone station set 305. If there is a loss of the radio frequency connectivity as determined at step 605, either due to the dual mode telephone station set 305 being out of range or being turned off, the cordless base station 306 is programmed to seize the POTS line at step 606 and dial a string of digits to the local wire-line telephone switching system 308 that activates the call forwarding function at step 607. When the dual mode telephone station set 305 activates call forwarding at step 607, the local wire-line telephone switching system 308 forwards all incoming calls to a Shadow Directory Number assigned to the Home Mobile Switching Center 311, as shown in FIG. 5. Alternatively, the calls can be forwarded to a voice mail system or some other destination, such as a call coverage server for reception by an attendant at that system.

When the dual mode telephone station set 305 returns within range of the cordless base station 306, as determined at step 602, the cordless base station 306 is programmed to seize the POTS line at step 603 and dial a string of digits to the local wire-line telephone switching system 308 that deactivates call forwarding at step 604. When the cordless dual mode telephone station set 305 deactivates call forwarding at step 604, the local wire-line telephone switching system 308 no longer forwards all incoming calls to a Shadow Directory Number assigned to the Home Mobile Switching Center 311.

Incoming Cellular Call in the Dual Mode Handset System

Figure 7:
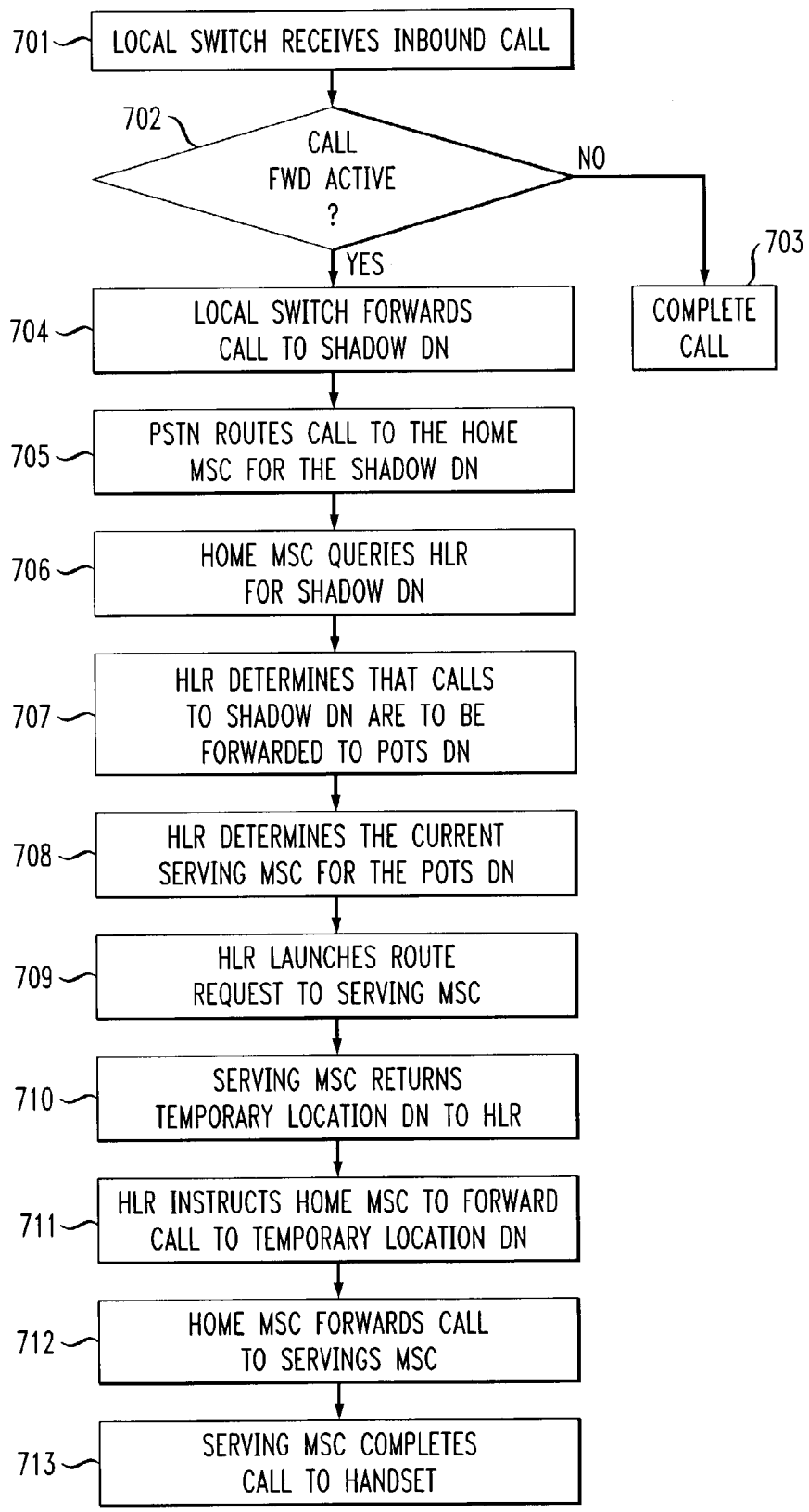
FIG. 7 illustrates in flow diagram form the steps taken by the cordless base station in the present dual mode handset system to terminate a call connection over the cellular network.

FIG. 7 illustrates in flow diagram form the steps taken by the local switch 308, home MSC 310, HLR 304 and serving MSC 303 in the present dual mode handset system to terminate a call connection over the cellular network 300.

The cellular service provider establishes a Home Location Register 304 which contains the normal records for a cell phone service subscription. This includes the MIN of the dual mode telephone station set 305, the telephone number of the dual mode telephone station set 305, the list of call processing features to which the subscriber is enabled, etc. The telephone number of the dual mode telephone station set 305 is a wire-line Directory Number, so the Shadow Directory Number is used for the purposes of providing a presence for the dual mode telephone station set 305 in the Home Mobile Switching Center 311. When the dual mode telephone station set 305 first registers on the cellular network 300, the Serving Mobile Switching Center 303 receives the MIN from the dual mode telephone station set 305. The Serving Mobile Switching Center 303 then contacts the Home Location Register 304 that serves the dual mode telephone station set 305 and completes the registration process as normal. When the dual mode telephone station set 305 originates a call, the process is consistent with existing cellular network call origination procedures, using the Caller ID for the subscriber's connection to a local wire-line telephone switching system 308.

When the local wire-line telephone switching system 308 receives an inbound call at step 701, the local wire-line telephone switching system 308 checks at step 702 to see if Call Forward All Calls is activated. If not, the call is processed in routine fashion at step 703 to the cordless base station 306 by the local wire-line telephone switching system 308. If Call Forward All Calls is activated, the local wire-line telephone switching system 308 forwards the call at step 704 to the Shadow Directory Number (630-444-1000) in the cellular network. The Home Mobile Switching Center 310 for the Shadow Directory Number receives the incoming call, step 705, and accesses the Home Location Register 304 to read out the data entries associated with the Shadow Directory Number in order to determine the status and present location of the dual mode telephone station set 305 at step 706. Within the Home Location Register 304 there is a software algorithm which indicates that the calls to the Shadow Directory Number are in fact to be forwarded to the POTS Directory Number of the dual mode telephone station set 305 at step 707. This algorithm can use the Multiple Directory Numbers per Mobile Identification Number capability of the Home Location Register 304 to maintain this dual presence of the dual mode telephone station set 305. At step 708, the Home Location Register 304 looks up the present serving Mobile Switching Center for the POTS Directory Number. At step 709, The Home Location Register 304 sends a route request to the Serving Mobile Switching Center 303 and the Serving Mobile Switching Center 303 at step 710 returns the temporary Location Directory Number to the Home Location Register 304. At step 711, the Home Location Register 304 instructs the Home Mobile Switching Center 310 to forward the call to the Temporary Location Directory Number on the Serving Mobile Switching Center 303 at step 712; and the Serving Mobile Switching Center 303 then completes the call to the dual mode telephone station set 305 at step 713.

SUMMARY

The dual mode handset system provides unified cellular service and wire-line service with a single Directory Number assigned to the dual mode handset so the Caller ID information is consistent on calls originated through the dual mode handset, regardless of whether the call passes through the cordless base station to the subscriber's connection to a local wire-line telephone switching system or the cellular network.

The invention claimed is:

1. A system for providing unified cellular and wire-line telephone service to a dual mode telephone station set that operates in both a cellular mode with a serving cellular mobile switching center and a wire-line mode through a cordless base station connected to a local wire-line telephone switching system, comprising:
    Shadow Directory means for assigning a single Directory Number to said dual mode telephone station set for use in both said serving cellular mobile switching center and said local wire-line telephone switching system; and
    cellular call origination means, responsive to said dual mode telephone station set originating an outgoing call in said serving cellular mobile switching center, for completing said call to a destination identified by said dual mode telephone station set, using a Caller ID of said single Directory Number.

2. The system for providing unified cellular and wire-line telephone service to a dual mode telephone station set of claim 1 further comprising:
    wire-line call origination means, responsive to said dual mode telephone station set originating an outgoing call through said cordless base station, for completing said call in said local wire-line telephone switching system to a destination identified by said dual mode telephone station set, using a Caller ID of said single Directory Number.

3. The system for providing unified cellular and wire-line telephone service to a dual mode telephone station set of claim 1 further comprising:
    dual mode telephone station set location means, responsive to said dual mode telephone station set being out of communication with said cordless base station, for activating a call forwarding function in said local wire-line telephone switching system for said single Directory Number.

4. The system for providing unified cellular and wire-line telephone service to a dual mode telephone station set of claim 3 further comprising:
    dual mode telephone station set reconnection means, responsive to said dual mode telephone station set establishing communications with said cordless base station subsequent to being out of communication with said cordless base station, for deactivating a call forwarding function in said local wire-line telephone switching system for said single Directory Number.

5. The system for providing unified cellular and wire-line telephone service to a dual mode telephone station set of claim 3 further comprising:
    call reception means, responsive to receipt of an incoming call directed to said dual mode station set, for forwarding said incoming call from said local wire-line telephone switching system to said serving cellular mobile switching center using a cellular telephone number assigned to said dual mode telephone station set.

6. The system for providing unified cellular and wire-line telephone service to a dual mode telephone station set of claim 5 further comprising:
    cellular call connection means, responsive to receipt of an incoming call in a Home Mobile Switching Center directed to said dual mode station set and forwarded from said local wire-line telephone switching system, for determining a present location of said dual mode station set associated with a serving cellular mobile switching center; and
    cellular call completion means for extending a call connection from said serving cellular mobile switching center to said dual mode telephone station set to serve said incoming call.

7. A method for providing unified cellular and wire-line telephone service to a dual mode telephone station set that operates in both a cellular mode with a serving cellular mobile switching center and a wire-line mode through a cordless base station connected to a local wire-line telephone switching system, comprising:
    assigning a single Directory Number to said dual mode telephone station set for use in both said serving cellular mobile switching center and said local wire-line telephone switching system; and
    completing, in response to said dual mode telephone station set originating an outgoing call in said serving cellular mobile switching center, said call to a destination identified by said dual mode telephone station set, using a Caller ID of said single Directory Number.

8. The method for providing unified cellular and wire-line telephone service to a dual mode telephone station set of claim 7 further comprising:
    completing, in response to said dual mode telephone station set originating an outgoing call through said cordless base station, said call in said local wire-line telephone switching system to a destination identified by said dual mode telephone station set, using a Caller ID of said single Directory Number.

9. The method for providing unified cellular and wire-line telephone service to a dual mode telephone station set of claim 7 further comprising:
    activating, in response to said dual mode telephone station set being out of communication with said cordless base station, a call forwarding function in said local wire-line telephone switching system for said single Directory Number.

10. The method for providing unified cellular and wire-line telephone service to a dual mode telephone station set of claim 9 further comprising;
deactivating, in response to said dual mode telephone station set establishing communications with said cordless base station subsequent to being out of communication with said cordless base station, a call forwarding function in said local wire-line telephone switching system for said single Directory Number.

11. The method for providing unified cellular and wire-line telephone service to a dual mode telephone station set of claim 9 further comprising:
forwarding, in response to receipt of an incoming call directed to said dual mode station set, said incoming call from said local wire-line telephone switching system to said serving cellular mobile switching center using a cellular telephone number assigned to said dual mode telephone station set.

12. The method for providing unified cellular and wire-line telephone service to a dual mode telephone station set of claim 11 further comprising:
determining, in response to receipt of an incoming call in a Home Mobile Switching Center directed to said dual mode station set and forwarded from said local wire-line telephone switching system, a present location of said dual mode station set associated with a serving cellular mobile switching center; and
extending a call connection from said serving cellular mobile switching center to said dual mode telephone station set to serve said incoming call.

* * * * *